United States Patent
Wikman et al.

(10) Patent No.: US 8,190,773 B2
(45) Date of Patent: May 29, 2012

(54) SYSTEM AND METHOD FOR ACCESSING A WEB SERVER ON A DEVICE WITH A DYNAMIC IP-ADDRESS RESIDING BEHIND A FIREWALL

(75) Inventors: Johan Wikman, Helsinki (FI); Ferenc Dosa, Helsinki (FI); Sakari Palko, Espoo (FI)

(73) Assignee: Nokia Corporation, Espoo (FI)

( * ) Notice: Subject to any disclaimer, the term of this patent is extended or adjusted under 35 U.S.C. 154(b) by 1543 days.

(21) Appl. No.: 11/144,966

(22) Filed: Jun. 3, 2005

(65) Prior Publication Data
US 2006/0274726 A1 Dec. 7, 2006

(51) Int. Cl.
*G06F 15/16* (2006.01)
(52) U.S. Cl. .......................... 709/245; 709/227; 709/237
(58) Field of Classification Search .......... 370/229–230; 726/11–14, 25–27; 709/245
See application file for complete search history.

(56) References Cited

U.S. PATENT DOCUMENTS

| | | | |
|---|---|---|---|
| 5,999,979 A * | 12/1999 | Vellanki et al. ............... | 709/232 |
| 6,182,141 B1 * | 1/2001 | Blum et al. .................... | 709/227 |
| 6,212,556 B1 | 4/2001 | Arunachalam | |
| 6,334,056 B1 | 12/2001 | Holmes et al. | |
| 6,519,568 B1 | 2/2003 | Harvey et al. | |
| 6,587,882 B1 | 7/2003 | Inoue et al. | |
| 6,591,306 B1 * | 7/2003 | Redlich ......................... | 709/245 |
| 6,631,416 B2 * | 10/2003 | Bendinelli et al. ............ | 709/227 |
| 6,631,417 B1 * | 10/2003 | Balabine ....................... | 709/229 |
| 6,647,001 B1 | 11/2003 | Bhagavath et al. | |
| 6,704,295 B1 | 3/2004 | Tari et al. | |
| 6,988,147 B2 | 1/2006 | King | |
| 7,236,470 B1 * | 6/2007 | Bims ............................. | 370/328 |
| 7,324,473 B2 * | 1/2008 | Corneille et al. ............. | 370/328 |
| 7,441,270 B1 * | 10/2008 | Edwards et al. ............... | 726/15 |
| 7,506,368 B1 * | 3/2009 | Kersey et al. .................. | 726/12 |
| 7,533,164 B2 * | 5/2009 | Volz et al. ..................... | 709/223 |
| 7,533,409 B2 * | 5/2009 | Keane et al. ................... | 726/13 |
| 7,810,148 B2 * | 10/2010 | Ben-Shachar et al. ......... | 726/11 |
| 7,814,533 B2 * | 10/2010 | Devine et al. .................. | 726/3 |
| 7,900,240 B2 * | 3/2011 | Terzis et al. ................... | 726/2 |
| 7,904,569 B1 * | 3/2011 | Gelvin et al. .................. | 709/229 |

(Continued)

FOREIGN PATENT DOCUMENTS
FR 2861934 5/2005
(Continued)

OTHER PUBLICATIONS
Microsoft Computer Dictionary, 5th Edition, p. 542.*
(Continued)

*Primary Examiner* — Jeffrey R Swearingen
*Assistant Examiner* — Melvin H Pollack
(74) *Attorney, Agent, or Firm* — Banner & Witcoff, Ltd (57) ABSTRACT

A system and method for providing access to a web server on an electronic device positioned within a firewall. A gateway device including a gateway server is provided outside of the firewall. The gateway device includes an IP address that corresponds to the same DNS extension that is used in the DNS name of the web server. When a client device attempts to contact the web server through the DNS name, the request is transmitted to the gateway server, which in turn communicates with the web server.

15 Claims, 6 Drawing Sheets

U.S. PATENT DOCUMENTS

| | | | |
|---|---|---|---|
| 7,949,785 B2 * | 5/2011 | Alkhatib et al. | 709/245 |
| 8,015,271 B2 * | 9/2011 | McKeown et al. | 709/223 |
| 8,037,202 B2 * | 10/2011 | Yeager et al. | 709/238 |
| 2002/0023140 A1 | 2/2002 | Hile et al. | |
| 2002/0078198 A1 * | 6/2002 | Buchbinder et al. | 709/224 |
| 2002/0199114 A1 * | 12/2002 | Schwartz | 713/201 |
| 2003/0033416 A1 * | 2/2003 | Schwartz | 709/230 |
| 2003/0039237 A1 | 2/2003 | Forslow | |
| 2003/0112823 A1 * | 6/2003 | Collins et al. | 370/474 |
| 2003/0154306 A1 * | 8/2003 | Perry | 709/245 |
| 2003/0174648 A1 * | 9/2003 | Wang et al. | 370/235 |
| 2004/0044778 A1 * | 3/2004 | Alkhatib et al. | 709/228 |
| 2004/0179537 A1 | 9/2004 | Boyd et al. | |
| 2005/0004968 A1 | 1/2005 | Mononen et al. | |
| 2005/0014489 A1 | 1/2005 | Zhigang | |
| 2005/0015386 A1 | 1/2005 | Mortensen et al. | |
| 2005/0073982 A1 * | 4/2005 | Corneille et al. | 370/338 |
| 2005/0148323 A1 * | 7/2005 | Little et al. | 455/414.1 |
| 2005/0180398 A1 * | 8/2005 | Deno et al. | 370/352 |
| 2005/0229243 A1 * | 10/2005 | Svendsen et al. | 726/12 |
| 2006/0272014 A1 * | 11/2006 | McRae et al. | 726/12 |
| 2007/0165579 A1 * | 7/2007 | Delibie et al. | 370/338 |
| 2008/0010676 A1 * | 1/2008 | Dosa Racz et al. | 726/11 |
| 2008/0281900 A1 * | 11/2008 | Boulia | 709/201 |
| 2010/0241846 A1 * | 9/2010 | Sundarrajan et al. | 713/151 |

FOREIGN PATENT DOCUMENTS

| | | |
|---|---|---|
| WO | 98/31124 | 7/1998 |
| WO | 02/067540 | 8/2002 |
| WO | WO2005/003987 A1 | 1/2005 |
| WO | 2005/043847 | 5/2005 |

OTHER PUBLICATIONS

International Search Report for Application PCT/IB2006/001449.
Non-Final Rejection for KR 10-2008-7000152 dated Apr. 30, 2009 (English Translation).
First Office Action in CN200680026629.7 dated Jul. 9, 2010, with English Translation.
Supplementary Search Report in European Patent Application No. 0676544.2, dated Feb. 3, 2011.
Office Action in Chinese Patent Application No. 200680026629.7, dated Aug. 9, 2011.
Office Action in European Patent Application No. 06765444.2-2413, dated Sep. 26, 2011.

* cited by examiner

SYSTEM AND METHOD FOR ACCESSING A WEB SERVER ON A DEVICE WITH A DYNAMIC IP-ADDRESS RESIDING BEHIND A FIREWALL

FIELD OF THE INVENTION

The present invention relates generally to web servers on mobile electronic devices. More particularly, the present invention relates to the accessing of web servers on mobile electronic devices that are located behind a firewall.

BACKGROUND OF THE INVENTION

Currently, network connectivity for mobile devices such as mobile telephones are provided by an operator. The network connectivity can involve the use of systems, such the general packet radio service (GPRS), that allow information to be sent and received across a mobile telephone network. It may be desirable for a server to be placed on that mobile device, where the server can be accessible by clients running on devices on the Internet.

In such a system, however, there are currently a number of obstacles that must be overcome. In current operator networks, mobile devices are assigned temporary Internet Protocol (IP) addresses. Client devices attempting to access a web server on such a device must therefore be provided with a way of reaching the server that is independent of the IP address that has been assigned to the mobile device. This constitutes a basic problem of addressability in such a system.

Even if a mobile device with a built-in server is assigned a static IP address, however, or if techniques such as dynamic domain name systems (DNS) are used, the server would still be inaccessible. This is due to the fact that operator firewalls typically do not allow connections to be created from a device on the Internet to a mobile device inside the operator's network. Instead, connections must be created from the inside of the operator's network and extend outward to the client device.

Although there have been attempts to address this accessibility issue, each of these proposed solutions possess serious shortcomings. One proposed solution involves port knocking. With port knocking, when certain firewall port numbers are knocked in a "secret" sequence, then one particular port number is opened for a short period of time. This concept is discussed at www.linuxjournal.com/article.php?sid=6811. Another solution involves the use of a firewall control protocol (FCP), which can enable a third, trusted party to dynamically control the firewall (i.e., which ports are opened, the period of time the ports are opened, which clients are permitted to have the ports opened, etc.) FCP is discussed at www.iptel.org/fcp/ietf-fcp.ppt. For both of these systems, however, there is a requirement that the out-of-network device be given at least some indirect control of the firewall. To satisfy this requirement, operators would need to invest more in their infrastructure and possibly attempt to solve a problem for which there is no correctly existing industry-standard. Moreover, making firewalls dynamically configurable would also result in a need to modify web browsers, which is undesirable.

In addition to the above, even if the mobile device possessing the server and the device from which the server is accessed are in the same operator network, there are still no guarantees that the server could be accessed, even if the client knows the temporary IP address. In particular, typical operators do not currently route packets directly between the mobile devices.

SUMMARY OF THE INVENTION

The present invention addresses the issues discussed above by introducing a gateway that transparently delivers requests from client devices on the Internet to a web server on a mobile device such as a mobile telephone. Similarly, the gateway delivers replies from the mobile web server to the client that initiated the request.

The system and method of the present invention provides for a number of advantages over conventional systems. The present permits access to a web server on mobile devices such as mobile phones in currently-existing operator networks, while not requiring any involvement from the operator of the respective device. Additionally, the present invention allows devices such as mobile telephones to become full members of the Internet, without having to wait for the Mobile IPv6 protocol to become available.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

Figure 1:
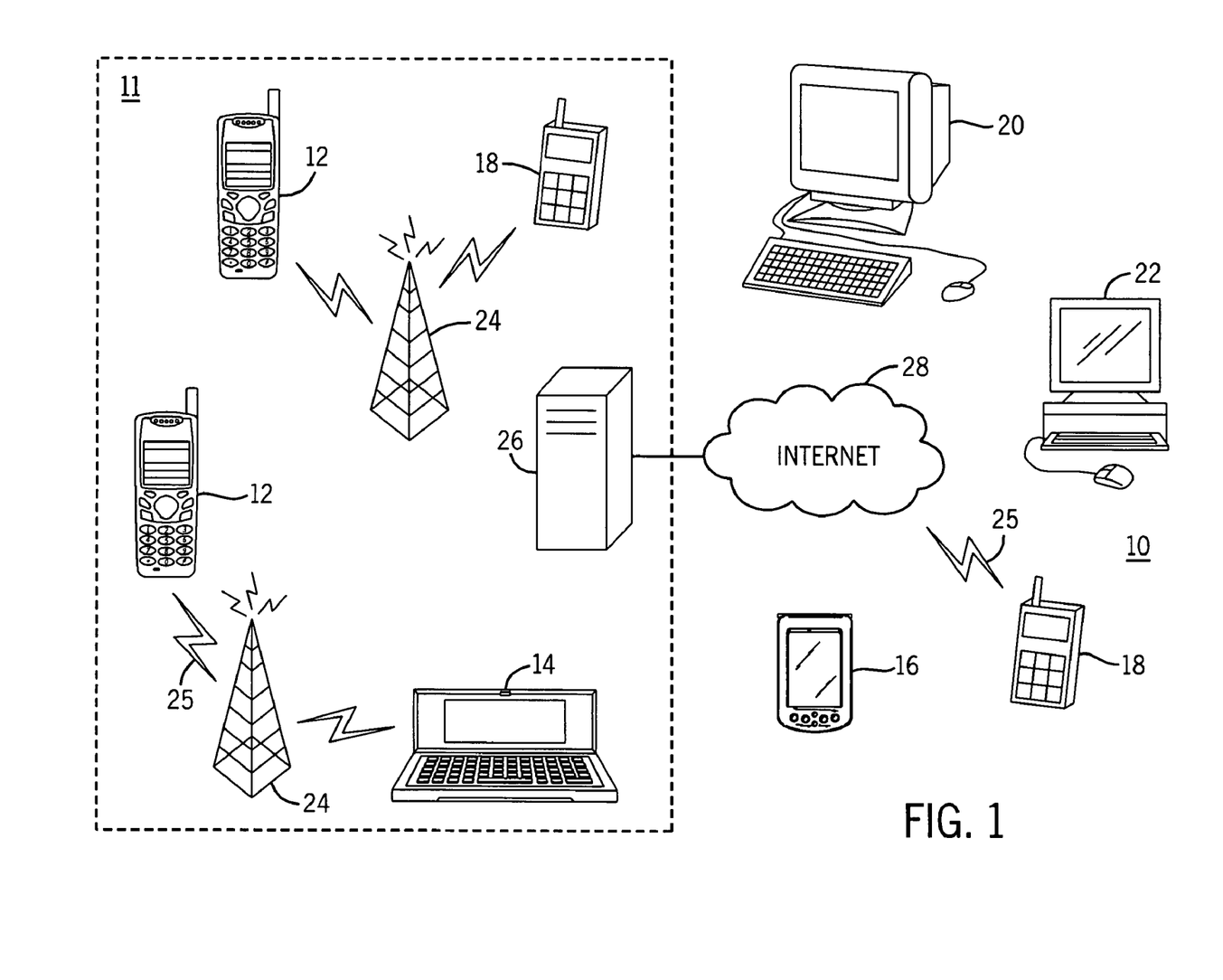
FIG. 1 is an overview diagram of a system according to an embodiment of the present invention.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
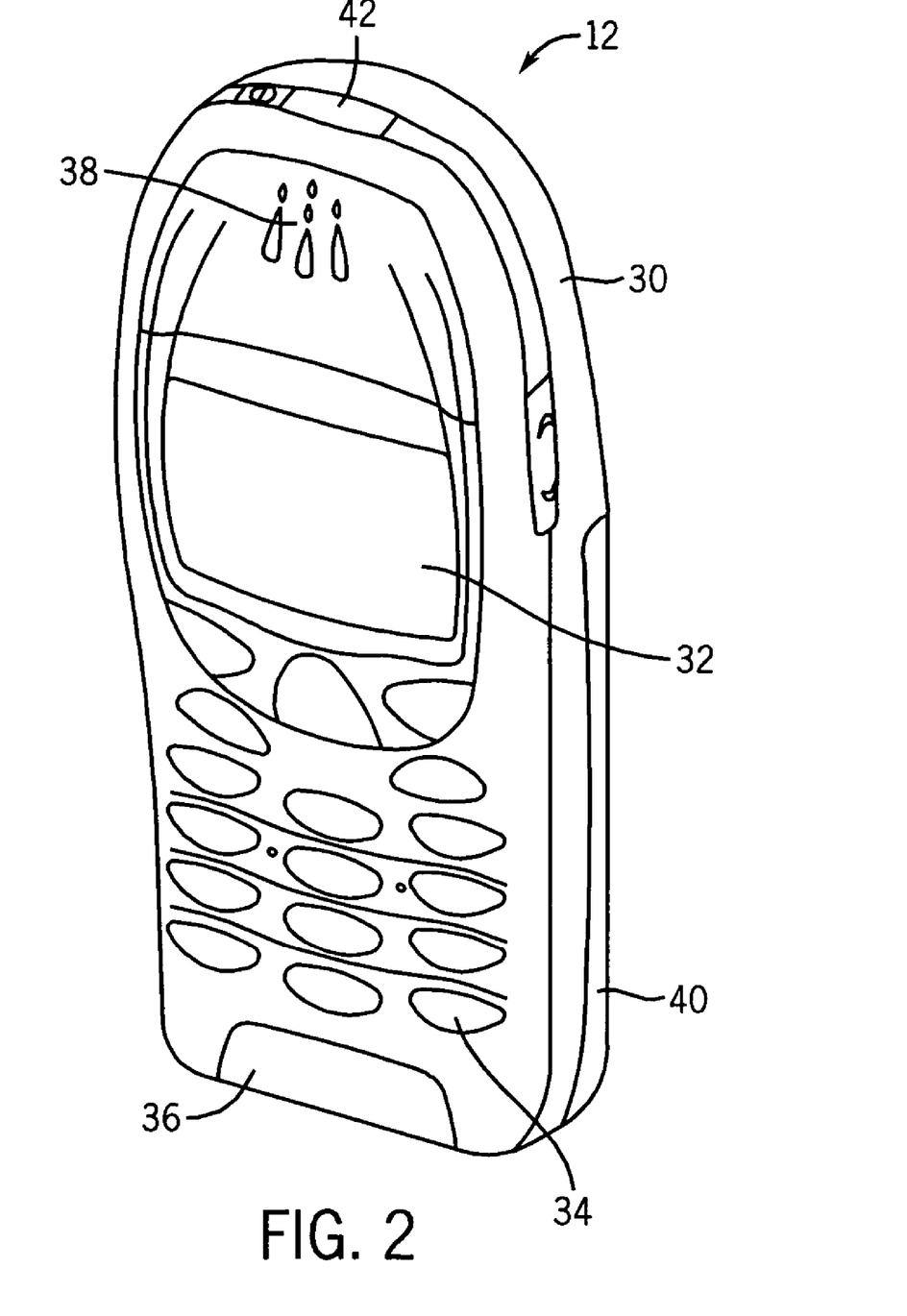
FIG. 2 is a perspective view of a mobile telephone that can be used in the implementation of the present invention.
Figure 3:
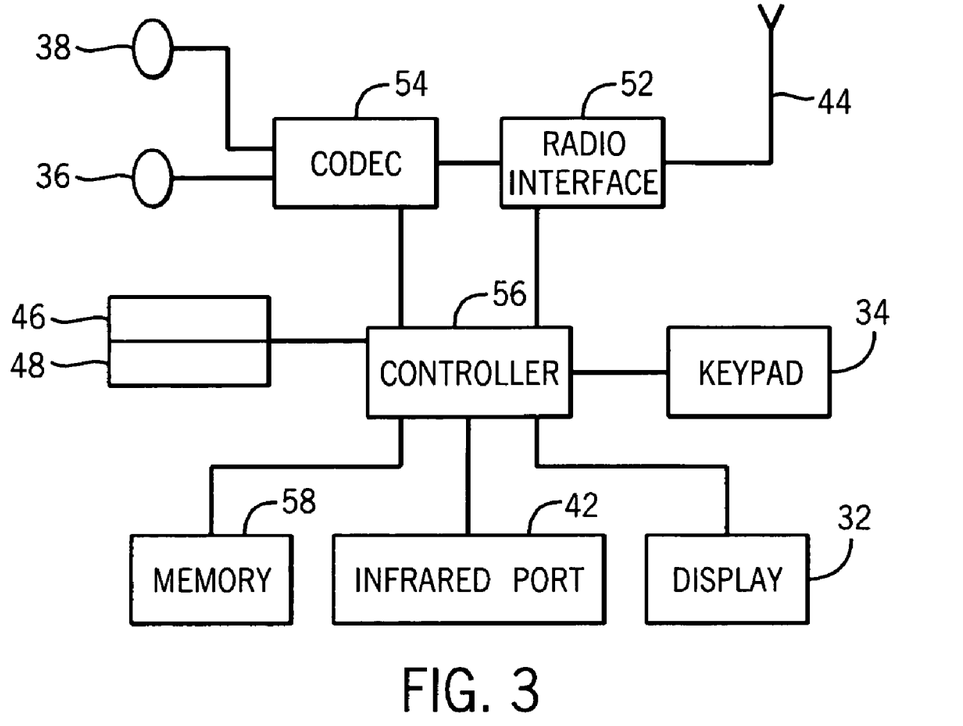
FIG. 3 is a schematic representation of the telephone circuitry of the mobile telephone of FIG. 2.

FIGS. 2 and 3 show one representative mobile telephone 12 according to one embodiment of the invention. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
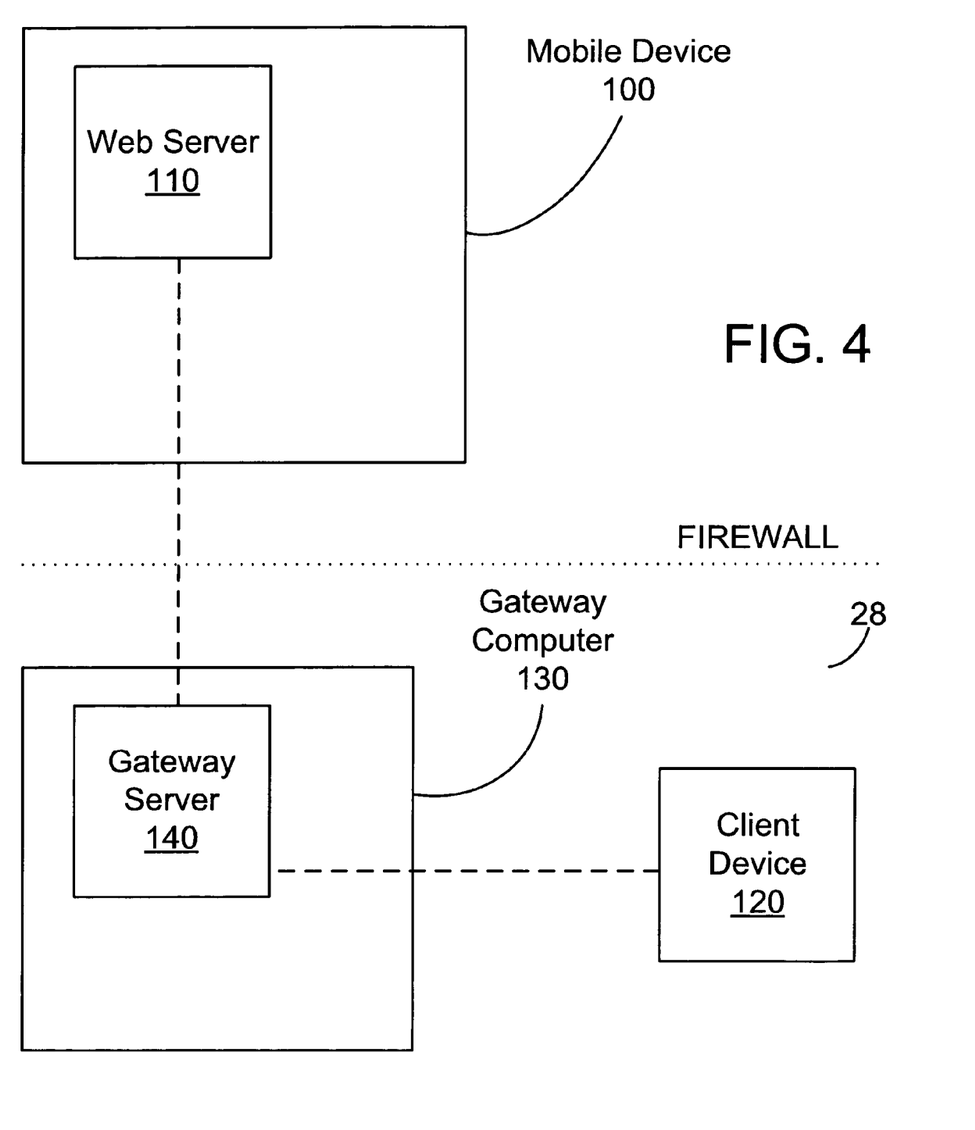
FIG. 4 is a representation of a simplified a mobile device, a client device, and a gateway computer/gateway server according to one embodiment of the present invention.

The present invention, depicted in simplified form in FIG. 4, operates in a situation where a mobile device 100, which does not have a fixed IP address, resides behind an operator firewall. The firewall prevents connections from being created from outside of the network to the mobile device 100, instead only permitting connections to be created from the mobile device 100 to outside of the network. The present invention addresses a situation where a web server 110 is to run on the mobile device, and it is desirable for the server 100 to be accessible to at least one client device 120 (both mobile and/or stationary) on the Internet 28.

According to the present invention, the protocol to be used in the communication between client device 120 on the Internet and the web server 110 on the mobile device 100 is such that the request, when sent by the client device 120 to the web server 110, contains information about which electronic device 100 the request is intended for. A gateway computer 130 is also set up somewhere on the Internet, outside of the operator firewall. The gateway computer 130 includes a gateway server 140 that listens on two ports. One port is well-known to client devices 120 on the Internet 28 (the HTTP port), while the port is referred to as a specific port. The client device 120, the mobile device 100 and the gateway computer 130 can all possess circuitry and functionality of the type described in FIG. 3.

The mobile device 100 containing the web server 110 proceeds to open a connection to the specific port of the gateway server 140. Each mobile device 100 is assigned a name and is arranged so that DNS lookups for that name result in the IP address of the gateway computer 130 being returned. The gateway server 140 looks at each request arriving from various client devices 120 to the well-known port and uses the content in order to deduce for which mobile device 100 the request is intended. The gateway server 140 then delivers the request over the connection that was opened by the mobile device 100. The web server 110 on the mobile device 100 will then return a reply over the same connection, and the reply is transmitted to the client device 120. In this process, it appears as if the web server 110 on the mobile device 100 is directly accessible from any client device 120 on the Internet. Thus, the mobile device 100 has become both addressable and accessible.

Figure 5:
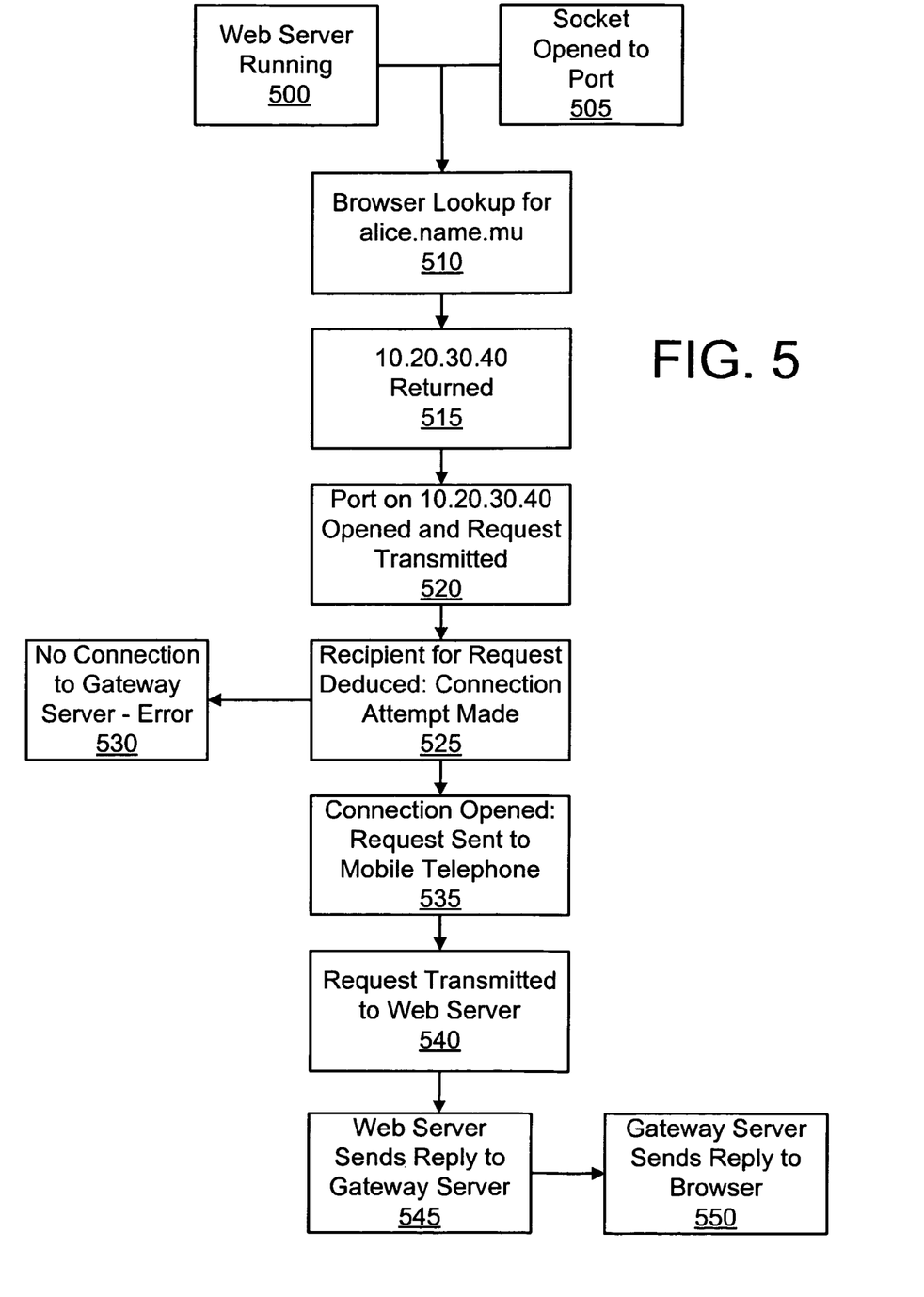
FIG. 5 is a flow chart showing the implementation of one embodiment of the present invention.

On implementation of the present invention is generally as follows and is represented in FIG. 5. In this particular implementation, the mobile device 100 comprises a mobile telephone, and the protocol is HTTP. In this implementation, a DNS is configured so that all DNS lookups ending in a particular extension, such as "name.mu", result in the IP address of the gateway computer. For illustrative purposes only, it is assumed that the IP address is 10.20.30.40. In practice, this means that lookups such as, for instance, alice.name.mu and bob.name.mu result in an IP address of 10.20.30.40.

As discussed earlier, the gateway computer 130 includes a gateway server 140, which listens to the usual HTTP port 80, and, for example to port 2050. On the mobile telephone, the web server 110 is running at step 500, and it listens to the usual HTTP port 80. However, this web server 110 is not accessible by anyone outside of the mobile telephone due to the problems discussed above. Furthermore, another process, referred to herein as the connector, is running, The connector opens a socket to port 2050 at step 505. As part of the opening of that socket, the connector declares the identity of the mobile telephone. As part of this opening sequence, the gateway server 140 learns the name of the mobile telephone. In this example, the mobile telephone is known as "alice."

In the event that someone on the Internet attempts to browse to alice.name.mu, the following sequence of events occurs. The browser on the client device 120 performs a lookup for alice.name.mu at step 510. This lookup returns 10.20.30.40 as a result at step 515, which is the IP address of the gateway server 140. The browser proceeds to the HTTP port 80 on 10.20.30.40 and to transmit a regular HTTP request at step 520. The HTTP request header includes alice.name.mu in its host field.

From the value of the host field, the gateway sever deduces the recipient for the request at step 525. If the device known as alice has opened a connection to the gateway server 140, then the gateway server 140 sends the request to the mobile telephone over that connection at step 535. If the mobile telephone has not opened a connection to the gateway server, then the gateway server 140 responds with the appropriate error reply at step 530. When the request reaches the connector on the mobile telephone, the connector transmits it to the web server 110 running on the mobile telephone at step 540. When the web server 110 replies, the connector sends the reply back to the gateway server at step 545. The gateway server then proceeds to send it back to the browser that made the initial request at step 550. Therefore, to the individual using the browser, it appears as if the mobile telephone was directly accessible using the url alice.name.mu.

Figure 6:
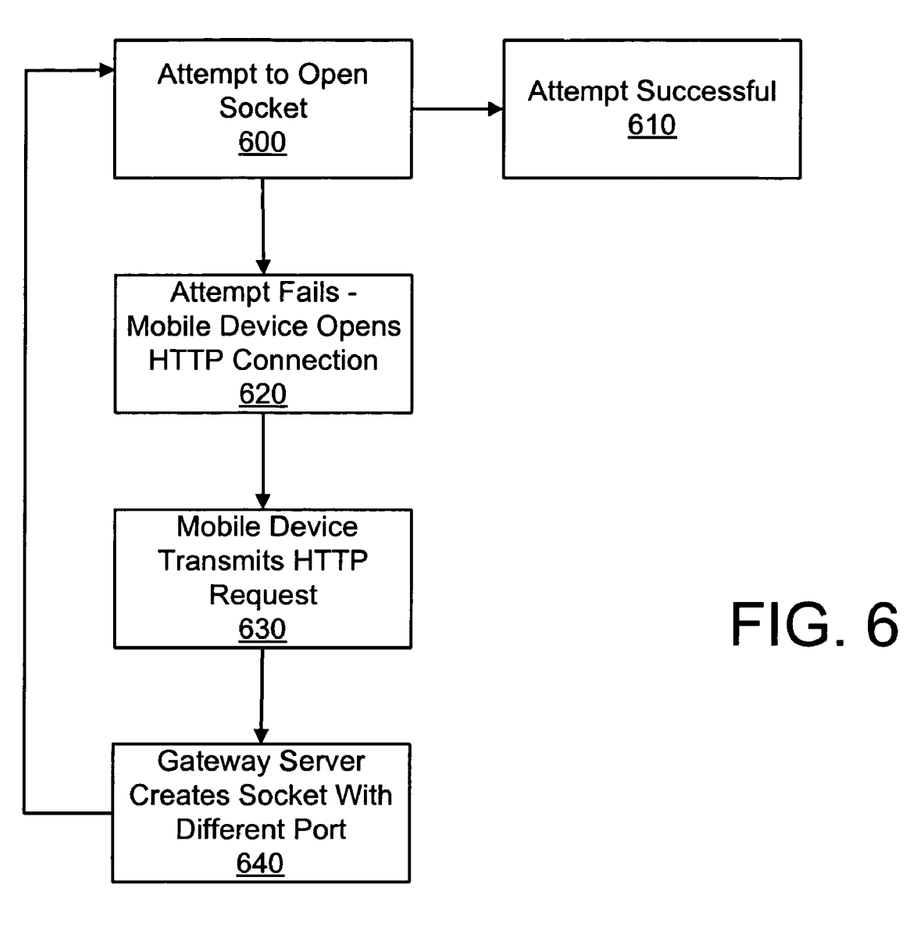
FIG. 6 is a flow chart showing a process for opening a socket between a client device and a gateway computer in the event that an operator has blocked a particular port to be used.

The solution depicted in FIG. 5 relies upon the mobile device 100 being able to open a TCP/IP socket from the mobile device 100 to the gateway server 140. However, an operator could prevent this creation from occurring by blocking the port that is used in the communication between the mobile device 100 and gateway computer 130. FIG. 6 is a flow chart showing a process for addressing this issue according to one embodiment of the present invention. In this process, it is assumed that the operator does not block every potential port, and that port 80 is not blocked by the operator.

As depicted in FIG. 6, the mobile device 100 attempts to open a socket to the gateway server 140 at step 600. If this succeeds, then no additional action is necessary and the process of FIG. 5 proceeds as discussed above. This is represented at step 610. If the attempt fails, this may be due to the fact that the operator has blocked the desired port in its firewall. In response, the mobile device 100 opens an HTTP connection to the gateway computer 130 using the regular web port 80 at step 620. This step is likely to succeed, as it is extremely unlikely that an operator would block this port. At step 630, the mobile device 100 transmits an HTTP request using a particular URL and informs the gateway server 140 that a particular port can no longer be used. At step 640, the gateway server 140 creates another incoming socket using a different port and, in the HTTP reply, informs mobile device 100 of the port number. The process is then repeated until an open port is found, at which time a socket is opened. This system makes it difficult, if not impossible, for an operator to prevent the connectivity solution of the present invention to be implemented unless all ports were blocked, which would render 2G and 3G networks meaningless unless a traffic analysis was performed on every connection.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   receiving, at a gateway server outside of a firewall from a mobile device behind the firewall, a request to open a hypertext transfer protocol (HTTP) connection using a first port;
   receiving, in a request from the mobile device over the HTTP connection, information indicating that a second port cannot be used;
   creating a socket using a third port in response to the received information indicating that the second port cannot be used;
   transmitting an indicator of the third port to the mobile device in an HTTP reply;
   receiving, at the gateway server from a client device, a request for information from a web server;
   transmitting the request for information to the mobile device over a connection created by opening the created socket;
   receiving a reply to the transmitted request from the mobile device;
   forwarding the reply from the mobile device to the client device: and
   subsequent to receipt of the information indicating that the second port cannot be used and prior to creating the socket using the third port:
   (a) creating a socket using a fourth port;
   (b) transmitting an indicator of the fourth port to the mobile device in an HTTP reply;
   (c) receiving, in a request from the mobile device over the HTTP connection, information indicating that a fourth port cannot be used; and
   (d) repeating (a) through (c) with regard to additional ports.

2. The method of claim 1, wherein an Internet Protocol (IP) address of the gateway server corresponds to a predetermined Domain Name System (DNS) extension, and wherein the request for information received from the client device is an HTTP request including a DNS name corresponding to the mobile device in a host field, and wherein the DNS name includes the predetermined DNS extension.

3. The method of claim 1, wherein the request for information received from the client device and the forwarded reply are communicated using a port other than the third port.

4. A memory having stored thereon instructions which, when executed by a processor, cause an apparatus to perform operations, said operations comprising:
   receiving, at a gateway server outside of a firewall from a mobile device behind the firewall, a request to open a hypertext transfer protocol (HTTP) connection using a first port;
   receiving, in a request from the mobile device over the HTTP connection, information indicating that a second port cannot be used;
   creating a socket using a third port in response to the received information indicating that the second port cannot be used;
   transmitting an indicator of the third port to the mobile device in an HTTP reply;
   receiving, at the gateway server from a client device, a request for information from a web server;
   transmitting the request for information to the mobile device over a connection created by opening the created socket;
   receiving a reply to the transmitted request from the mobile device;

forwarding the reply from the mobile device to the client device: and
subsequent to receipt of the information indicating that the second port cannot be used and prior to creating the socket using the third port:
(a) creating a socket using a fourth port;
(b) transmitting an indicator of the fourth port to the mobile device in an HTTP reply;
(c) receiving, in a request from the mobile device over the HTTP connection, information indicating that a fourth port cannot be used; and
(d) repeating (a) through (c) with regard to additional ports.

5. The memory of claim 4, wherein an Internet Protocol (IP) address of the gateway server corresponds to a predetermined Domain Name System (DNS) extension, and wherein the request for information received from the client device is an HTTP request including a DNS name corresponding to the mobile device in a host field, and wherein the DNS name includes the predetermined DNS extension.

6. The memory of claim 4, wherein the request for information received from the client device and the forwarded reply are communicated using a port other than the third port.

7. An apparatus, comprising:
a gateway server having a controller configured to:
receive, when the gateway server is outside of a firewall and from a mobile device behind the firewall, a request to open a hypertext transfer protocol (HTTP) connection using a first port,
receive, in a request from the mobile device over the HTTP connection, information indicating that a second port cannot be used,
create a socket using a third port in response to the received information indicating that the second port cannot be used,
transmit an indicator of the third port to the mobile device in an HTTP reply,
receive, from a client device, a request for information from a web server,
transmit the request for information to the mobile device over a connection created by opening the created socket,
receive a reply to the transmitted request from the mobile device,
forward the reply from the mobile device to the client device, and
subsequent to receipt of the information indicating that the second port cannot be used and prior to creating the socket using the third port,
(a) create a socket using a fourth port,
(b) transmit an indicator of the fourth port to the mobile device in an HTTP reply,
(c) receive, in a request from the mobile device over the HTTP connection, information indicating that a fourth port cannot be used, and
(d) repeat (a) through (c) with regard to additional ports.

8. The apparatus of claim 7, wherein an Internet Protocol (IP) address of the gateway server corresponds to a predetermined Domain Name System (DNS) extension, and wherein the request for information received from the client device is an HTTP request including a DNS name corresponding to the mobile device in a host field, and wherein the DNS name includes the predetermined DNS extension.

9. The apparatus of claim 7, wherein the request for information received from the client device and the forwarded reply are communicated using a port other than the third port.

10. A method comprising:
attempting, from a mobile device behind a firewall, to open a socket at a gateway server outside the firewall using a second port;
in response to failure of the attempt to open the socket using the second port, opening a hypertext transfer protocol (HTTP) connection to the gateway server using a first port;
sending information to the gateway server, over the opened HTTP connection, indicating that the second port cannot be used;
receiving an HTTP reply from the gateway server in response to the sent information, the HTTP reply including an indicator of a third port;
opening a socket at the third port and creating a second connection;
receiving, from the gateway server over the second connection, a relayed request from a client device for information from a web server running on the mobile device;
transmitting a reply to the relayed request to the gateway server: and
subsequent to sending information to the gateway server indicating that the second port cannot be used and prior to receiving the HTTP reply including the indicator of the third port:
(a) creating a socket using a fourth port;
(b) receiving an HTTP reply from the gateway server including an indicator of the fourth port;
(c) sending information to the gateway server indicating that the fourth port cannot be used; and
(d) repeating (a) through (c) with regard to additional ports.

11. The method of claim 10, wherein the mobile device is one of a mobile telephone, a personal digital assistant (PDA), a combination mobile telephone and PDA, or an integrated messaging device.

12. A memory having stored thereon instructions which, when executed by a processor, cause an apparatus to perform operations, said operations comprising:
attempting, from a mobile device behind a firewall, to open a socket at a gateway server outside the firewall using a second port;
in response to failure of the attempt to open the socket using the second port, opening a hypertext transfer protocol (HTTP) connection to the gateway server using a first port;
sending information to the gateway server, over the opened HTTP connection, indicating that the second port cannot be used;
receiving an HTTP reply from the gateway server in response to the sent information, the HTTP reply including an indicator of a third port;
opening a socket at the third port and creating a second connection;
receiving, from the gateway server over the second connection, a relayed request from a client device for information from a web server running on the mobile device;
transmitting a reply to the relayed request to the gateway server: and
subsequent to sending information to the gateway server indicating that the second port cannot be used and prior to receiving the HTTP reply including the indicator of the third port, additional operations comprising:
(a) creating a socket using a fourth port;
(b) receiving an HTTP reply from the gateway server including an indicator of the fourth port;

(c) sending information to the gateway server indicating that the fourth port cannot be used; and (d) repeating (a) through (c) with regard to additional ports.

13. The memory of claim 12, wherein the mobile device is one of a mobile telephone, a personal digital assistant (PDA), a combination mobile telephone and PDA, or an integrated messaging device.

14. An apparatus, comprising:

a mobile device including a controller configured to:

attempt, when the mobile device is behind a firewall, to open a socket at a gateway server outside the firewall using a second port, in response to failure of the attempt to open the socket using the second port, open a hypertext transfer protocol (HTTP) connection to the gateway server using a first port, send information to the gateway server, over the opened HTTP connection, indicating that the second port cannot be used, receive an HTTP reply from the gateway server in response to the sent information, the HTTP reply including an indicator of a third port, open a socket at the third port and create a second connection, receive, from the gateway server over the second connection, a relayed request from a client device for information from a web server running on the mobile device, transmit a reply to the relayed request to the gateway server, and subsequent to sending information to the gateway server indicating that the second port cannot be used and prior to receiving the HTTP reply including the indicator of the third port, (a) create a socket using a fourth port, (b) receive an HTTP reply from the gateway server including an indicator of the fourth port, (c) send information to the gateway server indicating that the fourth port cannot be used, and (d) repeat (a) through (c) with regard to additional ports.

15. The apparatus of claim 14, wherein the mobile device is one of a mobile telephone, a personal digital assistant (PDA), a combination mobile telephone and PDA, or an integrated messaging device.

* * * * *